(12) United States Patent
Theodore

(10) Patent No.: US 7,416,668 B1
(45) Date of Patent: Aug. 26, 2008

(54) WASTEWATER CHEMICAL/BIOLOGICAL TREATMENT PLANT RECOVERY APPARATUS AND METHOD

(75) Inventor: Marcus G. Theodore, Salt Lake City, UT (US)

(73) Assignee: Earth Renaissance Technologies, LLC, Salt Lake City, UT (US)

( * ) Notice: Subject to any disclaimer, the term of this patent is extended or adjusted under 35 U.S.C. 154(b) by 0 days.

(21) Appl. No.: 11/728,710

(22) Filed: Mar. 27, 2007

(51) Int. Cl.
*C02F 3/00* (2006.01)
(52) U.S. Cl. .................. 210/603; 210/743; 210/749; 210/724; 210/767; 210/916; 210/173
(58) Field of Classification Search .................. 210/603, 210/743, 749, 724, 767, 916, 173
See application file for complete search history.

(56) References Cited

U.S. PATENT DOCUMENTS

| 4,304,673 A | 12/1981 | Reynolds et al. |
| 4,340,489 A | 7/1982 | Adams et al. |
| 4,765,911 A | 8/1988 | Rasmussen |
| 5,906,750 A | 5/1999 | Haase |

*Primary Examiner*—Chester T. Barry
(74) *Attorney, Agent, or Firm*—Marcus G. Theodore

(57) ABSTRACT

A chemical/biological wastewater treatment plant method and apparatus employing rapid sludge chemical dewatering technology in conjunction with an environmental biological system for treating the separated treated wastewater by land applying it for plant consumption, and/or passing it through aqueous plant or microbial reduction of the dissolved solids and ammonia for BOD compliance to produce water of sufficient quality to meet open stream and ocean effluent discharge requirements; and disposing of the high BTU low moisture solids.

26 Claims, 7 Drawing Sheets

| Influent | Ammonia-N | Nitrate-N | Nitrite-N | Oil & grease | pH | Antimony | Arsenic | Beryllium | Cadmium | Chromium III | Chromium IV | Copper | Lead | Mercury | Nickel | Selenium | Silver |
|---|---|---|---|---|---|---|---|---|---|---|---|---|---|---|---|---|---|
| TKN | | | | | | | | | | | | | | | | | |
| 40 mg/L | 21 mg/l | ND | ND | 28 mg/l | 7.63 | ND | ND | ND | ND | ND | ND | .17 mg/l | ND | ND | .012 mg/l | ND | ND |
| | | | | | 8 | | | 0 | | | | | | | | | |
| .7 mg/l | | <.04 mg/l | 2.1 mg/l | | 7.5 | | | | | | | | | | | | |
| <1.9 mg/l | | <.04 mg/l | 2.6 mg/l | | 7.5 | | | | | | | | | | | | |
| Post Influent SO2 treatment | | | | | | | | | | | | | | | | | |
| TKN | Ammonia-N | Nitrate-N | Nitrite-N | Oil & grease | pH | Antimony | Arsenic | Beryllium | Cadmium | Chromium III | Chromium IV | Copper | Lead | Mercury | Nickel | Selenium | Silver |
| 32 mg/l | 31 mg/l | .27 mg/l | ND | ND | 2.82 | ND | ND | ND | ND | 0.0092 | | 0.068 | ND | ND | 0.031 | ND | ND |
| 34 mg/l | 34 mg/l | .21 mg/l | ND | ND | 9.44 | ND | ND | ND | ND | ND | | 0.011 | ND | ND | 0.026 | ND | ND |
| | | | | | | | | | | | | | | | | | |
| Activated Waste Influent | | | | | | | | | | | | | | | | | |
| TKN | Ammonia-N | Nitrate-N | Nitrite-N | Oil & grease | pH | Antimony | Arsenic | Beryllium | Cadmium | Chromium III | Chromium IV | Copper | Lead | Mercury | Nickel | Selenium | Silver |
| 56 mg/l | 1.9 mg/l | ND | ND | 13 mg/l | 6.98 | ND | ND | ND | ND | .037 mg/l | | 3.0 mg/l | .036 mg/l | .023 mg/l | .097 mg/l | .073 mg/l | ND |
| | | | | | | | | | | | | | | | | | |
| Activated Waste Effluent | | | | | | | | | | | | | | | | | |
| TKN | Ammonia-N | Nitrate-N | Nitrite-N | Oil & grease | pH | Antimony | Arsenic | Beryllium | Cadmium | Chromium III | Chromium IV | Copper | Lead | Mercury | Nickel | Selenium | Silver |
| | | | | | | | | | | | | | | | | | |
| Ennix Digester Inf. | | | | | | | | | | | | | | | | | |
| TKN | Ammonia-N | Nitrate-N | Nitrite-N | Oil & grease | pH | Antimony | Arsenic | Beryllium | Cadmium | Chromium III | Chromium IV | Copper | Lead | Mercury | Nickel | Selenium | Silver |
| | | | | | | | | | | | | | | | | | |
| Ennix Digester Effluent | | | | | | | | | | | | | | | | | |
| TKN | Ammonia-N | Nitrate-N | Nitrite-N | Oil & grease | pH | Antimony | Arsenic | Beryllium | Cadmium | Chromium III | Chromium IV | Copper | Lead | Mercury | Nickel | Selenium | Silver |
| 180 mg/l | 120 mg/l | .31 mg/l | ND | 200 mg/l | 7.18 | ND | ND | ND | ND | | | ND | .0061 MG/L | ND | ND | ND | ND |
| 160 mg/l | 130 mg/l | ND | .43 mg/l | ND | 7.88 | ND | 0.11 mg/l | ND | ND | | | .018 mg/l | ND | ND | .012 mg/l | ND | ND |
| | | | | | 7.8 | | | | | | | | | | | | |
| Effluent Limitations | | | | | | | | | | | | | | | | | |
| TKN | Ammonia-N | Nitrate-N | Nitrite-N | Oil & grease | pH | Antimony | Arsenic | Beryllium | Cadmium | Chromium III | Chromium IV | Copper | Lead | Mercury | Nickel | Selenium | Silver |
| 10 mg/L | 10mg/L | | 1mg/L | 15 mg/L | 6.5-8.5 | .008 mg/L | 0 mg/L | .004 mg/L | .005 mg/L | 0.1 mg/L tot | .01 mg/L tot. | 1.3 mg/L | 0 mg/L | .05 mg/L | .1mg/L | .01mg/L | .05 mg/L |

FIG. 4a

| | zinc | total solids | total dissolved solids | TSS(tot.sus.sol.) | total org. carbon | BOD's | Sulfate | Chloride | CaCO3 | | Carbonate | Hydroxide Alk | Bicarbonate | Sampling date |
|---|---|---|---|---|---|---|---|---|---|---|---|---|---|---|
| Influent | | | | | | | | | | | | | | |
| Thallium | | 2550 mg/l | | | | | | | 450 mg/l | | ND | | 540 mg/l | 31-Jul |
| ND | 0.15 | | 1800 mg/l | 70 mg/l | 26 mg/l | 180 mg/l | 740 mg/l | 160 mg/l | 360 mg/l | | | | 360 mg/l | 18-Oct M3-I |
| | | | | 250 mg/l | | 270 mg/l | | | | | | | | MMID May 2006 |
| | | | 2150 mg/l | | | | 918 mg/l | 223 mg/l | | | | | | MMID 2005 An.Sum Avg. |
| | | | 2000 mg/l | | | | 820 mg/l | 250 mg/l | | | | | | MMID 2005 An. Sum Nov |
| Post Influent SO2 treatment | | | 2159 mg/l | | | | | | | | | | | MMID May 2006 |
| Thallium | zinc | total solids | total dissolved solids | TSS | total org. carbon | BOD's | Sulfate | Chloride | CaCO3 | | Carbonate | Hydroxide Alk | Bicarbonate | Sampling date |
| ND | 0.037 | 2100 mg/l | 2100 | ND | 71 mg/l | 170 mg/l | 880 mg/l | 130 mg/l | ND | | ND | ND | ND | 29-Nov-2006 M-I-3-A |
| ND | ND | 1800 mg/l | 1800 | ND | 88 mg/l | 170 mg/l | 880 mg/l | 140 mg/l | 140 mg/l | | 140 mg/l | ND | 140 mg/l | 29-Nov-2006 M-4-4-AL |
| Activated Wastewater | | | | | | | | | | | | | | |
| Thallium | zinc | total solids | total dissolved solids | TSS | total org. carbon | BOD's | Sulfate | Chloride | CaCO3 | | Carbonate | Hydroxide Alk | Bicarbonate | Sampling date |
| ND | 2.2 mg/l | | 1800 mg/l | 5400 mg/l | 100 mg/l | 2000 mg/l | 820 mg'l | 260 mg/l | 520 mg/l | | ND | | 520 mg/l | 18-Oct M-2W |
| Activated Waste Effluent | | | | | | | | | | | | | | |
| Thallium | zinc | total solids | total dissolved solids | TSS | total org. carbon | BOD's | Sulfate | Chloride | CaCO3 | | Carbonate | Hydroxide Alk | Bicarbonate | Sampling date |
| Ennix Digester Influent | | | | | | | | | | | | | | |
| Thallium | zinc | total solids | total dissolved solids | TSS | total org. carbon | BOD's | Sulfate | Chloride | CaCO3 | | Carbonate | Hydroxide Alk | Bicarbonate | Sampling date |
| Ennix Digester Effluent | | | | | | | | | | | | | | |
| Thallium | zinc | total solids | total dissolved solids | TSS | total org. carbon | BOD's | Sulfate | Chloride | CaCO3 | | Carbonate | Hydroxide Alk | Bicarbonate | Sampling date |
| | | 2550 mg/l | | | | | | | | | | | | 31-Jul |
| ND | ND | | 1700 mg/l | 10 mg/l | 66 mg/l | 34 mg/l | 200 mg/l | 210 mg/l | 1300 mg/l | | ND | | 1300 mg/l | 18-Oct M7-F/A |
| ND | .048 mg/l | | 2000 mg/l | 56 mg/l | 95 mg/l | 350 mg/l | 180 mg/l | 270 mg/l | 1300 mg/l | | ND | | 1300 mg/l | 19-Oct M-1-Edecant |
| | | | | 12 mg/l | | 12 mg/l | | | | | | | | MMID May 2006 |
| Effluent Limitations | | | | | | | | | | | | | | |
| Thallium | zinc | total solids | total dissolved solids | TSS | total org. carbon | BOD's | Sulfate | Chloride | CaCO3 | | Carbonate | Hydroxide Alk | Bicarbonate | |
| .002mg/L | 5mg/L | | 3,000 mg/L | 30 mg/L | 20 mg/L | 30 mg/L | 1,000 mg/L | 500 mg/L | | | | | | |

FIG. 4b

WASTEWATER CHEMICAL/BIOLOGICAL TREATMENT PLANT RECOVERY APPARATUS AND METHOD

BACKGROUND OF THE INVENTION

1. Field

This invention comprises a rapidly installed wastewater treatment plant solids and liquids recovery system apparatus and method employing chemical dewatering and biological treatment technology.

2. State of the Art

Various sewage treatment methods and plants are known. Most large municipal systems employ a series of settling ponds sequentially concentrating the solids contained in wastewater either with or without polymers for separation from liquids via mechanical separation means, such as belt presses. In order to produce a clean effluent that can be safely discharged to watercourses, wastewater treatment operations use three or four distinct stages of treatment to remove harmful contaminants; according to the United Nations Environmental Programme Division of Technology, Industry, and Economics Newsletter and Technical Publications Freshwater Management Series No. 1, *"Biosolids Management: An Environmentally Sound Approach for Managing Sewage Treatment Plant Sludge"* which goes on to say: "Each of these stages mimics and accelerates processes that occur in nature.

Preliminary wastewater treatment usually involves gravity sedimentation of screened wastewater to remove settled solids. Half of the solids suspended in wastewater are removed through primary treatment. The residual material from this process is a concentrated suspension called primary sludge, which will undergo further treatment to become biosolids.

Secondary wastewater treatment is accomplished through a biological process, which removes biodegradable material. This treatment process uses microorganisms to consume dissolved and suspended organic matter, producing carbon dioxide and other by-products. The organic matter also provides nutrients needed to sustain the communities of microorganisms. As microorganisms feed, their density increases and they settle to the bottom of processing tanks, separated from the clarified water as a concentrated suspension called secondary sludge, biological sludge, waste activated sludge, or trickling filter humus.

Tertiary or advanced treatment is used when extremely high-quality effluent is required, such as direct discharge to a drinking water source. The solid residual collected through tertiary treatment consists mainly of chemicals added to clean the final effluent, which are reclaimed before discharge, and therefore not incorporated into biosolids.

Combined primary and secondary solids comprise the majority of material used at municipal plants for biosolids production. Careful management throughout the entire treatment process allows plant operators to control the solids content, nutrient value and other constituents of biosolids.

The Municipal Sludge-to-Biosolids Treatment Process

There are three important factors to be addressed through further processing before this material can be utilized: (1) pathogen levels, (2) presence of potentially harmful industrial contaminants, and (3) water content.

The principal process employed to convert municipal sludge into biosolids is called stabilization. Stabilization accelerates the biodegradation of organic compounds, reduces the microbial population including pathogens, and renders the material microbiologically safe for agricultural use. Biological stabilization uses aerobic or anaerobic treatment to reduce the organic content of solids through controlled biodegradation. Chemical stabilization does not reduce the quantity of biodegradable organic matter in solids, but creates process conditions that inhibit microorganisms, thereby slowing the degradation of organic materials and reducing odors. The most common chemical stabilization procedure is to elevate the pH level of the solids using lime or other alkaline materials. Thermal drying and composting can also be used to stabilize biosolids. Full pasteurization of biosolids is not needed when the primary use is cropland application. Any potential risk to human health due to exposure to pathogens is eliminated through proper application procedures and in-situ microbial decomposition.

The presence of contaminants in the sludge or biosolids arising from industrial discharges is a more challenging problem and may be the deciding factor in determining the choice of a utilization disposal option. Put simply, many industries have habitually used the sewer system as a convenient and low-cost way to discharge hazardous wastes. The contaminants accumulate in the biomass and sludge, and can render the material unfit for any beneficial use. The most common options used for disposal of this contaminated material are landfill or incinerations, the cost of which is usually borne by the municipality rather than the hazardous waste generator. Biosolids utilization is a good, environmentally sustainable option when the wastewater is from municipal sources only, or when a fully enforced industrial pre-treatment and discharge control system is in place. The decision to select an environmentally sustainable approach to biosolids management can be used very effectively to review and correct polluting practices up-stream that should not be taking place.

The final concern is the water content of the biosolids product. Primary and secondary sludge generally contain no more than four percent solids, and the storage and transportation costs of this semi-liquid material limit the application to nearby farmland. Processes to remove water from solids, therefore, are common in biosolids production. The simplest method for removing water is gravity thickening, which involves concentration by simple sedimentation. Allowing sufficient time for solids to settle in tanks can increase suspended solids concentration to five or six percent. Thickening can also include flotation processes, gravity drainage belts, perforated rotating drums, and centrifuges. Nothing is added to biosolids during the gravity thickening processes.

Dewatering is another standard method of water removal in biosolids production. Simple dewatering involves containment of wastewater solids in drying beds or lagoons, where gravity, drainage, and evaporation remove moisture. More often, dewatering involves mechanical equipment such as filter presses, vacuum filters, and centrifuges. Mechanically dewatered solids typically contain between 20% and 45% solids. Finally, drying processes can be used to remove even larger volumes of water from biosolids. Thermal drying with direct or indirect dryers followed by polarization can remove virtually all water and stabilize biosolids to the point of full compliance with any regulatory requirement. This method is used where there is a viable commercial market for the palletized product."

Thus a particular wastewater treatment facility design is highly dependent upon the wastewater inflows and sludge composition and the discharge and treatment permitting restrictions and plant objectives. Oftentimes these plant designs employ thermophilic and other digestion processes to break down the sludge as part of the separation process. For example, Haase, U.S. Pat. No. 5,906,750 discloses a method for dewatering of sludge that has been digested by a thermophilic digestion process employing polymers. The polymers are extremely hydrophilic as they agglomerate fine particles for separation from the wastewater in the belt presses. This gelatinous mechanically separated mass is then usually land filled or admixed with other fuels for burning, and may contain significant pathogens and heavy metals. Once deposited and covered, these landfills do not breakdown rapidly. They comprise large deposits of unstable gelatinous soil, which acts as a breading ground for pathogens. If these separated solids are treated with chlorine for pathogen kill, chlorinated carcinogens often result, creating a different environmental hazard.

The mechanically separated gray water by-product is usually not treated and is then used for agricultural application, or dumped into a body of water for dilution. If treated with chlorine to kill pathogens before land application or dumping, its usage for agricultural purposes is lost as chlorine acts as an herbicide.

In addition, mechanical sludge separation typically requires a large series of settling ponds with wastewater residence times therein typically from 24 to 48 hours, depending upon the weather and nature of the sludge processed. Typically, landfill and polymer costs comprise approximately 30 percent of the wastewater treatment costs.

Other mechanical filtration methods provide sludge separation, but require continual unplugging of the filters; thereby generating significant ongoing costs of filter replacement and declining effectiveness as the filter is entrained with the separated solids.

As long as a mechanical sewage separation plant does not have to be moved and operates within its environmental discharge and landfill permit constraints, it provides a low operating and maintenance cost effective sewage disposal method but requires significant upfront capital investment and may result in long term environmental clean-up costs. As urban populations being served grow, and landfill costs increase, these plants seldom meet permitting constraints without significant upgrades in design, particularly with respect to pathogen gray water discharge and the negative impacts caused by mountains of gelatinous solids.

Other chemical wastewater treatment methods employ chemical agglomeration and disposal methods, such as Adams et al., U.S. Pat. No. 4,340,489 wherein wastewater is treated with sufficient sulfurous acid to effectuate disinfection. Polymers and other separation methods are then employed to remove the solids. Reynolds et. al, U.S. Pat. No. 4,304,673 is another wastewater treatment process employing chemicals to continuously disinfect sewage sludge in a similar manner as Adams et al. Rasmussen, U.S. Pat. No. 4,765,911 is another two-stage chemical treatment process for treating aerobic or anaerobic sewage sludge. These chemical wastewater treatment methods are not package systems, which can be moved to accommodate the needs of a community, particularly in riparian areas subject to flooding, and rely heavily on polymers. They do not address BOD's and ammonia in treated wastewater.

Thus there remains a need for a method and apparatus, which provides a rapidly installed mobile package sewage treatment system, which can retrofit existing plants or provide an entirely new plant to chemically treat and recover wastewater solids and liquids for subsequent environmental biological usage and polishing. The method and apparatus described below provides such an invention.

SUMMARY OF THE INVENTION

The present invention comprises a rapidly installed wastewater treatment plant solids and liquids recovery system apparatus and method employing combination chemical dewatering and biological treatment technology.

Method

The method comprises a chemical/biological wastewater treatment plant method for wastewater with dissolved and undissolved solids, which can be chemically dewatered by the injection of sulfur dioxide to condition and deodorize liquids and solids for recovery. Wastewater, as used herein, is principally directed to domestic sewage from dwellings, business buildings, institutions, which contain ground water, surface waster, and/or storm water. It is not restricted to wastewater, which has already undergone primary and secondary treatment according to conventional treatment processes. Consequently, it can also be employed as a primary and secondary treatment process. It can also address other industrial wastes displaying the same conditioning and deodorizing characteristics in response to sulfur dioxide treatment. The method comprises testing water quality at various points in an existing or proposed wastewater treatment plant for its contaminant and solids composition. Typically, this includes an analysis of TKN, Ammonia-N, Nitrate-N, Nitrite-N, Oil and grease, pH, Antimony, Arsenic, Beryllium, Cadmium, Chromium III, Chromium IV, Copper Lead, Mercury, Nickel, Selenium, Silver, Thalium, Zinc, total solids, total dissolved solids, total suspended solids, total carbon, BOD's, Sulfate, Chloride, CaCo3, Carbonate, Hydroxide-Alk, Bicarbonate at various points in the plant.

Next, the treatment plant's present or projected end use effluent discharge requirements for various contaminants are reviewed and compared against the water quality analysis of the contaminant and solids composition at various points within the plant or at a new plant's headworks. A treatment point is then selected for pH adjusting and injecting sulfur dioxide into the wastewater to meet all or most of the end use effluent discharge requirements. A typical wastewater treatment plant employs sequential processes, which successively concentrate solids for separation and disposal. Unfortunately, this also concentrates the dissolved salts and contaminants in the liquid fraction, causing sequentially treated liquids to often exceed the effluent limits of the plant's discharge permit. Consequently, the present method is preferably applied at points further upstream, such as the entering influent at the treatment plant head works, as the point for deodorizing and conditioning the wastewater. However, it may also be employed at any wastewater treatment point where the concentrates of the effluent salts and contaminants are not too high for land application in combination with sulfurous acid for soil conditioning and plant growth. Thus, where the attached claims refer to "inflows" or "influent", it is also contemplated that the method and apparatus applies to the treatment of effluent and decant wastewaters where their concentrations of salts and contaminants are not too high for land application when acidified with sulfurous acid to effectuate solids conditioning and plant growth. As sulfurous acid reduces the bicarbonate buildup in soils allowing better water penetration and washing of salts out of soils, sulfurous acid treated waters, even with higher salt concentrations, still provide waters of sufficient quality for crop cultivation. Consequently, the treatment point may be selected at any point in the wastewater treatment plant where the resultant sulfurous acid treated wastewater is disinfected and produces a conditioned water suitable for land application.

After selecting the treatment point, sulfur dioxide from tanks associated with a contact mixer, or from sulfurous acid generators, such as those produced by Harmon International, LLC of Bakersfield, Calif., is injected into the wastewater at a pH between approximately 1.5 and approximately 3. This generates sufficient SO2 to condition solids for separation and deodorize the wastewater. Heretofore, it was felt that passing the wastewater directly through a sulfurous acid generator would foul its acid scrubbing tower. It was found through testing that sulfinurous acid generators, such as the Harmon International, LLC models condition and treat incoming raw wastewater solids to self agglomerate into colloidal self adhering solids so that they do not adhere to the packing in the sulfur generator contact tower. Thus, these sulfurous acid generators produce a sulfurous acid treated wastewater solids and liquid composition having a pH of approximately 1.5 to 3; provided the larger foreign matter is first coarsely screened or commutated with a grinder so that the larger particles do not obstruct the packing of the sulfurous acid generator acid tower. The water tower packing provides an excellent contact media insuring effective SO2 contact with the wastewater solids and liquids. The acid generator also has the advantage of generating SO2 as needed, avoiding the dangers of stored SO2 tank storage. However, the main advantage in passing the wastewater directly through the sulfurous acid generator is that it doesn't add additional acid and water to the wastewater treatment and separation process as is encountered with split streaming wherein a second acid is added to lower the pH to generate free SO2 for disinfection. Consequently, the treated wastewater volume is not affected.

Conditioning of the solids is defined as treating the solids with sufficient SO2 such that they will chemically dewater when allowed to drain, forming a fairly dry solid with a BTU content approximating wood chips or shavings. Conditioning generally results in a color change of the solids from a dark brown to a lighter gray brown color. Similarly, the SO2 treated liquids generally change from a greenish color to a lighter gray brown colloidal suspension color. The malodorous smell of the raw wastewater is also replaced by a slight acidic smell. Consequently, the conditioning point can easily be determined by injecting more and more SO2 into the wastewater until the color and odor changes occur—usually observed at a pH of approximately between 1.5 and 3. Sulfur dioxide has lone pairs and can act as a Lewis base. It can also act as a Lewis acid. The dissolved SO2 gaseous content also varies with temperature. For example, the grams/liter of dissolved sulfur dioxide in water at 20 degrees C. is 106.4 gr/l. It is 55.4 gr.l at 40 degrees. It is 32.5 gr.l at 60 degrees, and 21.3 gr./l at 80 degrees.

Consequently, this sulfurous acid treated wastewater system with free SO2 present in solution at a low pH forms a complex liquid/gas/solid phase chemistry system where reactions are difficult to exactly describe and quantify, but the above sulfurous acid wastewater conditioning endpoints are distinct. The conditioning of the wastewater and solids via oxidation/reduction reactions thus form self adhering solids, which shed water upon drying, and wastewater with high plant nutrients at the point where the odor reduction and color changes of the conditioned solids and liquids occur.

The sulfurous acid treated wastewater is then held in a detention vessel, which captures any excess SO2 emitted by the wastewater for reinjection, until the suspended solids agglomerate, the dissolved solids and ammonia are conditioned, and the required disinfection occurs. Exposure at an elevated pH of approximately 2 with a free SO2 concentration of at least 5 mg/l. for approximately 10 minutes results in complete disinfection according to Adams et al. U.S. Pat. No. 4,340,489. Detention at 30 minutes not only results in complete disinfection, but little significant additional solids separation and agglomeration occurs according to the Montalvo test results discussed below.

The agglomerated solids from the sulfurous acid treated wastewater are then screened to remove suspended solids in the separated treated wastewater at the level required by the end use effluent handling requirements for disposal. For example, for irrigation sprinkler usage, suspended particulates in the treated liquids under 200 microns are acceptable. Larger solids settling to the bottom or floating on top are easily removed with a courser filtering media, such as the Geotube® Model GT500 polypropylene woven bags produced by Ten Cate Nicolan of Atlanta, Ga. These Geotubes leave fine colloids approximately 425 microns in size in the screened liquid of a size that will not interfere with other types of open irrigation equipment. If it is desired to remove these fine colloids, they can be removed with a Geutube® Model GT1000 tighter weave polypropylene woven bag, which leaves fine suspended conditioned solids approximately 150 microns in size. These fines can be totally removed with finer filters approximately 100 microns or less in size producing a clear filtrate solution containing dissolved solids and ammonia as discussed below. According to TenCate Nicolan, these drain bags normally act in three stages:

Containment: High strength permeable geotextiles with uniquely designed retention properties are fabricated into Geotube® brand containers that can be filled with fine grain sludge, hazardous contaminated soils, or dredged waste materials.

Dewatering: Excess water drains from the Geotube® brand containers through the small pores in the geotextiles resulting in effective dewatering and efficient volume reduction of the contained material. This volume reduction allows for the repeated filling of the Geotube® brand container. In many cases the decanted water is of a quality that can be returned to native waterways or for reuse.

Consolidation: After the final cycle of filling and dewatering, the retained fine grain materials can continue to consolidate by desiccation because the residual water vapor escapes through the geotextile.

The screened sulfurous acid filtrate is then pH adjusted to reduce the biocidal properties of the free SO2 in the wastewater by raising the pH and provide the pH required for subsequent environmental biological treatment.

Screened pH adjusted sulfinurous acid filtrate of the wastewater inflows is high in dissolved solids and nutrients and some ammonia, and lower in salts, providing a solution which promotes rapid bacteria and plant growth, which can be measured in its high BOD's. It is then environmentally biologically treated, preferably by land applying it for plant consumption, where the dissolved solids and ammonia act as soil amendments promoting plant growth, as well as providing some insect repellant protection as it has been observed that insects avoid fields where the sulfinurous acid solutions have been applied. The types of crops selected, or the manner of application is determined by the local gray water consumption restriction regulations.

Alternatively, the filtered, disinfected, pH adjusted wastewater may be passed through aqueous plants or bacterial microbes for reduction of the dissolved solids and ammonia for BOD compliance to produce water of sufficient quality to meet open stream and ocean effluent discharge requirements. For example, a wastewater treatment plant's aerobic digesters may be used for this purpose, or preferably the conditioned wastewaters are passed through wetlands for reduction or removal of these dissolved solids and ammonia from the wastewater to produce high quality water meeting BOD discharge requirements.

When adjacent off-site aqueous plant or aerobic bacteria are available for employment for reduction of the dissolved solids and ammonia in the filtered liquid fraction before entry into an open stream or ocean, the BOD reduction effluent requirements are met with minimal capital cost expenditure. Alternatively, duckweed aquaculture ponds may be employed for this purpose where land costs are not prohibitive and sufficient lands for ponding is available.

As discussed, the deodorizing and conditioning of the wastewater is preferably accomplished by passing the wastewater through a sulfurous acid generator with an acid scrubbing tower for admixing with sulfur dioxide at a pH which generates sufficient free SO2 to condition solids for separation and deodorize the wastewater. The sulfurous acid generator produces SO2 as needed in its aqueous form minimizing exposure to this biocidal gas.

If heavy metals are present in sufficient amounts in the filtered treated liquid fraction, the separated treated wastewater pH is raised to precipitate heavy metals contained in the wastewater for filtration removal, resulting in metal free filtrate. A pH of up to 11 will precipitate all of the heavy metals as metal hydroxides, which can be removed with filtration. This high pH is then acid reduced for environmental biological treatment—usually to a pH range of approximately 6 to approximately 8. Other factors in the selection of this pH is the soil alkalinity in a region, and whether the treated wastewater will be land applied or discharged to an aqueous environment.

The high pH around 11 also causes ammonia to separate into a gas for possible removal through scrubbing where the ammonia level in the acid treated wastewater is too high for plant consumption.

The preferred treatment point of the method comprises the wastewater treatment plant inflows, as both the solids and liquids have lower contaminant concentrations and can be run through an acid generator without fouling its acid tower packing. This method coarsely screens the majority portion of the wastewater inflow stream before passing it through the sulfurous acid generator, which lowers its pH to approximately 2 with one or two passes (usually the bicarbonate and alkalinity of the inflows at the head works are not high enough to prevent achieving the necessary wastewater conditioning with one pass through the machine). A self cleaning screen over the end of the sulfurous acid generator intake tube is employed for this purpose with the screen porosity selected such that the inflow stream suspended solids do not plug up the acid scrubbing tower of the sulfurous acid generator. The remaining portion of the separated wastewater stream is then collected in a slurry and transferred via a grinder pump, etc. along with the acid injected wastewater inflows into a detention vessel for admixing so that the sulfur dioxide conditions the total wastewater inflows. The acid treated wastewater inflows are then held for a period of time until the wastewater odor is suppressed and the suspended solids are conditioned to agglomerate and separate from the liquid fraction of the wastewater for subsequent solids separation by filtration.

The preferred filtering means comprises passing the sulfurous acid treated wastewater through an acid resistant porous bag such as the Geotubes discussed above. The porous bags are placed on a drain pad structured to receive the sulfur dioxide treated wastewater after it drains from the drain bag. The bag mesh is sized to collect and separate particles of suspended solids of a desired size leaving a solution of a desired colloid content. Although tighter mesh removes all or most of the solids, it requires more drainage time. These porous mesh bags are preferred because they require little labor and are made of a polymer, which has a high BTU content, which can be burned or gasified along with the chemically dried solids contained therein. These chemically dried solids are low in water content and have the consistency of fibrous cardboard. Tests at the Montalvo Wastewater Treatment Plant indicated an average treated solids BTU content of 5690 BTU's/lb, and a moisture content of 42.1% of its oven dry weigh[1], which are acceptable for municipal burners.

[1] moisture content for wood ranges from 0% oven dried wood to greater that 200% for a living tree, using this lab formula $$MC\% = (\text{weight of moist wood} - \text{weight of oven dried wood}) / (\text{weight oven dried wood}) \times 100\%$$

The dwell tank holding time varies based on the wastewater content. It is selected to sufficiently agglomerate the suspended solids for capture within the porous bag. The longer the holdings time the more agglomeration results. However, after about one half hour, separation of the majority of the solids, which are going to separate, has occurred. The remaining small colloidal fines remain in suspension and can be removed, if desired by using tighter mesh bags or filters or filtration media for separation. The separated suspended solids are then allowed to chemically dewater in the porous bag to provide the high BTU content solid with low water content for burning or gasification.

In extreme climates subject to freezing, other filtering means, such as belt presses and screening means, which can be housed in a heated enclosure may be employed, such as the Finescreen Monster™ produced by JWC Environmental of Santa Ana, Calif.

The following is a preferred universal chemical/biological wastewater treatment plant method for wastewater inflow streams with dissolved and undisolved solids, which can be chemically dewatered by the injection of sulfur dioxide to condition and deodorize both the liquids and solids for recovery. The method comprises:

a. determining the end use effluent requirements for uses of the treatment plant's treated wastewater, b. deodorizing and conditioning the treatment plant wastewater inflows by screening the majority portion of the wastewater inflow stream and passing it through a sulfurous acid generator with an acid scrubbing tower for admixing with sulfur dioxide at a pH which generates sufficient free SO2 to condition solids for separation and deodorize the wastewater, the screen porosity selected such that the inflow stream does not plug up the acid scrubbing tower of the sulfurous acid generator, c. collecting the remaining portion of the separated wastewater stream with the larger particles, d. transmitting both portions into a detention vessel in communication with the acidified wastewater inflow stream and larger particle wastewater stream, for admixing sufficient sulfur dioxide into the total wastewater inflows and holding the same for a period of time until the wastewater odor is suppressed and the suspended solids are conditioned to agglomerate and separate from the liquid fraction of the wastewater for solids separation by filtration and the dissolved solids and ammonia are conditioned and the required effluent disinfection occurs, e. screening the agglomerated solids from the sulfurous acid treated wastewater to remove suspended solids at the level required by the end use effluent requirements for disposal, f. pH adjusting the screened treated wastewater by raising its pH to reduce the biocidal properties of the free SO2 in the wastewater and provide the required pH for subsequent environmental biological treatment, and g. environmentally biologically treating the separated treated wastewater by land applying it for plant consumption, and/or passing it through aqueous plant or microbial reduction of the dissolved solids and ammonia for BOD compliance to produce water of sufficient quality to meet open stream and ocean effluent discharge requirements.

Unless the heavy metals are high, pH adjusting of the separated treated wastewater to precipitate heavy metals contained in the wastewater for filtration removal is not required. The pH adjusted acid treated wastewater is thus raised to the required pH for subsequent environmental biological treatment for polishing the separated water to the end user requirements. The dried separated solids are then preferably disposed of in a municipal burner or gasifier. Alternatively, they may be land applied as they are disinfected and the heavy metals have been acid leached from them in the process.

Apparatus

An example of a preferred chemical/biological wastewater treatment plant apparatus for wastewater with dissolved and undissolved solids, which can be chemically dewatered by the injection of sulfur dioxide to condition and deodorize liquids and solids for recovery comprises a vault with a grinder for receiving wastewater influent from a municipal wastewater gathering system. These commutated wastewater inflows are then passed into various types of storage and treatment vessels. A sulfurous acid generator with an acid scrubbing tower, and pump with a self cleaning screened covered hose end is then placed in communication with the wastewater influent in the storage or treatment vessels and passed through its sulfurous acid generator acid scrubbing tower for injecting SO2 into the screened wastewater. The sulfurous acid treated wastewater is repeatedly passed through the sulfurous acid generator, if required, until a pH is generated with sufficient sulfurous acid and free SO2 for odor suppression and conditioning the suspended solids. At a pH of approximately 1.5 to 3, the suspended solids agglomerate and separate from the liquid fraction of the wastewater for solids separation by filtration. The sulfurous acid treated wastewater is then pumped into detention vessels.

If the wastewater treatment plant does not have an auger or grinder to reduce the size of the screened suspended solids in the wastewater inflows, similar comminuting means are included for use on the remaining portion of the unfiltered wastewater stream to reduce its larger particles into a commutated wastewater slurry stream for subsequent admixing with the sulfurous acid treated wastewaters in the detention vessel. Generally, the wastewater treatment plant's own grinder commutated wastewater inflows are slurry pumped to the detention vessels for admixing with the SO2 treated wastewater influent. The detention vessel holding time is selected as described above to deodorize and conditioning the combined wastewater influent, until the suspended solids agglomerate, dissolved solids and ammonia are conditioned, and the required effluent disinfection occurs. The detention vessel is enclosed to capture any excess SO2 released from the SO2 treated wastewater influent for re-injection into the wastewater inflows.

Screening means, such as filtration bags, belt presses, and other mechanical separators are employed to separate the suspended solids from the sulfurous acid treated wastewater from the drained detention vessels. The type of filtration employed is selected to remove suspended solids at a level required by the specific end use effluent requirements for disposal. Again, the preferred screening means comprises acid resistant porous bags placed on a drain pad structured to receive the sulfur dioxide treated wastewater. The drain bag is selected with a mesh sized to collect and separate particles of suspended solids of a desired size leaving a solution of a desired colloid content. For most filtration applications, passage through a single drain bag provides the desired filtration. Alternatively, these bags may be employed in series to promote faster draining by first removing the larger particles, before passing the suspended colloid particles through a bag with finer mesh. For example, the TenCate Geotube Model GT500 drain bag has a U.S. Sieve # 40 with an apparent opening size of 425 mm more particularly described in the table below is used to first remove larger particles.

| Mechanical Properties | Test Method | Unit | Minimum Average Roll Value | |
| --- | --- | --- | --- | --- |
| | | | Machine Direction | Cross Direction |
| Wide Width Tensile Strength (at ultimate) | ASTM D 4595 | kN/m (lbs/in) | 70 (400) | 96.3 (550) |
| Wide Width Tensile Elongation | ASTM D 4595 | % | 20 (max.) | 20 (max.) |
| Factory Seam Strength | ASTM D 4884 | kN/m (lbs/in) | 70.1 (400) | |
| Apparent Opening Size (AOS) | ASTM D 4751 | mm (U.S. Sieve #) | 0.425 (40) | |
| Water Flow Rate | ASTM D 4491 | l/m/m$_2$ (gpm/ft$_2$) | 813 (20) | |
| Mass/Unit Area | ASTM D 5261 | g/m$_2$ (oz/yd$_2$) | 585 (17.3) (Typical Value) | |
| UV Resistance (% strength retained after 500 hrs) | ASTM D 4355 | % | 80 | |

The filtered treated wastewater may then be run through a TenCate Geolon® GT1000 drain bag composed of high-tenacity polyester multifilament yarns, which are woven into a stable network such that the yarns retain their relative position. The Geolon GT1000 has a U.S. Sieve #100 with an apparent opening size of 150 microns more particularly described in the table below.

| Mechanical Properties | Test Method | Unit | Minimum Average Roll Value | |
|---|---|---|---|---|
| | | | MD | CD |
| Wide Width Tensile Strength (at ultimate) | ASTM D 4595 | kN/m (lbs/in) | 175 (1000) | 175 (1000) |
| Wide Width Tensile Elongation (at ultimate) | ASTM D 4595 | % | 15 (max.) | 15 (max.) |
| Trapezoidal Tear | ASTM D 4533 | kN (lbs) | 3.6 (800) | 3.6 (800) |
| Factory Seam Strength | ASTM D 4884 | kN/m (lbs/in) | 87.5 (500) | |
| Puncture Strength | ASTM D 4833 | kN (lbs) | 1.8 (400) | |
| Apparent Opening Size (AOS) | ASTM D 4751 | mm (U.S. Sieve #) | 0.150 (100) | |
| Water Flow Rate | ASTM D 4491 | l/m/m$_2$ (gpm/ft$_2$) | 240 (6) | |
| UV Resistance (% strength retained after 150 hrs) | ASTM D 4355 | % | 65 | |

If these drain bags are interconnected and placed in series, they are sized so that the flow rates through the bags allow continuous flow—i.e. the GT 5000 bags with a flow rate of 813 l/minute/m2 in communication with the GT 1000 bags with a flow rate of 240 l/minute/m2 requires them to be three and a third times larger, or their number of same size bags increased so that the flow rates through both bags provide continuous flow. Where the plant drainage footprint is of sufficient size, the matching of the drain bags sizes is not critical, and standby extra capacity drain bags are generally employed to accommodate storm wastewater surges.

These combination bags, when placed in series, thus produce a filtrate substantially less than 200 microns required for land application through existing sprinkler and irrigation equipment.

The filtered acidified wastewater is then collected and pH adjusted employing pH adjustment means, such as the skid mounted lime injection equipment produced by Metalfab, Inc. of Vernon, N.J. This particular equipment is a continuous lime feeding apparatus employed for adjusting the separated treated wastewater to reduce the biocidal properties of the free SO2 in the wastewater and provide the pH required for subsequent environmental biological treatment.

In cold weather conditions where long freezes are encountered, a mechanical separator is employed instead of the drain bags to remove the suspended solids. Continuous bag screening systems such as the Finescreen Monster™ and Bandscreen Monster™ produced by JWC Environmental of Costa Mesa, Calif. have small footprints and produce a fairly dry filtrate solid. These units can be housed indoors, along with the dwell tanks, and liming equipment in a small enclosed building to provide an all weather chemical biological wastewater treatment system. The screens are generally selected to only remove the larger particle unwanted conditioned suspended solids to provide treated wastewater with sufficient plant nutrients for field application. However, if desired, finer and finer screens could be employed to provide more polished filtered water.

The pH adjusted separated and treated wastewater is then passed through an environmental biological system for further reduction of the dissolved solids and ammonia, or by land applying it for plant consumption. The manner of land application is dependent upon the type of crop and whether it is consumed raw. When the pH adjusted separated and treated wastewater is pathogen free, the manner of land application is generally not restricted. Alternatively, the pH adjusted separated and treated wastewater may be passed through a wetlands transition zone where aqueous plant or microbial reduction of the dissolved solids and ammonia occurs to reduce BOD's to produce water of sufficient quality to meet open stream and ocean effluent discharge requirements.

Wastewater treatment inflows entering a wastewater treatment plant generally have relatively low heavy metals content. However, in those regions near mining tailings or industrial sites, heavy metal contamination of the liquids entering the treatment plant can be significant. Also, where the heavy metals in the solids are so high limiting their use for land application, these heavy metals are removed in the process by acid leaching them into the liquid fraction by the sulfurous acid wastewater treatment. To remove these heavy metals from the liquid fraction, the pH of the separated treated wastewater is raised sufficiently to precipitate those heavy metals contained in the wastewater as metal hydroxides as described above for filtration removal via belt presses or tighter weave polyethylene woven bags or other filtration means.

The holding time in the dwell tank is selected to sufficiently agglomerate the suspended solids for capture within the porous bag and deodorize and/or disinfect the liquid fraction. These separated suspended solids are allowed to chemically dewater to provide a dried high BTU content solid with low water content for burning or gasification. The demetalized treated wastewater is disposed of in stream or ocean water to dilute heavy metal concentrations in these bodies of water to minimize eutrophication.

The actual design of the wastewater treatment apparatus employing the method depends on the polishing requirements of the separated water for end use. The small footprint and rapid chemical treatment of the wastewater inflows provides opportunities to install the system and re-inject the treated wastewaters at various points in an existing plant. Thus, portions of an existing plant's processing equipment are often incorporated in treating the solids and separated liquids by combining treatment streams and solids. For example, where an existing plant has generated higher moisture content polymer separated solids, these may be admixed with the drier chemically separated dried solids in a ratio to provide a combined fuel with reduced overall moisture content for burning or gasification. Also, if the existing plant produces a lower BOD dissolved solid liquid stream, they may be combined with the higher acid treated BOD liquid stream to produce an overall lower dissolved solid liquid fraction requiring less biological treatment.

SUMMARY

The chemical/biological wastewater treatment plant method and apparatus optimizes sewage treatment by employing rapid sludge chemical dewatering technology in conjunction with an environmental biological system for treating the separated treated wastewater by land applying it for plant consumption, and/or passing it through aqueous plant or microbial reduction of the dissolved solids and ammonia for BOD compliance to produce water of sufficient quality to meet open stream and ocean effluent discharge requirements. It has a small footprint and can be integrated to supplement or replace the existing equipment and processes of an existing wastewater treatment plant to optimize solids separation and treated water recovery.

DESCRIPTION OF THE DRAWINGS

FIG. 3 cancelled.

FIGS. 4a and 4b illustrate a table of the laboratory test results of the Montalvo Wastewater Treatment Plant treated and untreated wastewaters.

DESCRIPTION OF THE ILLUSTRATED EMBODIMENTS

The method and apparatus of the present invention was field tested at the Montalvo Municipal Improvement District Water Pollution Control Plant in Ventura, Calif. for recovery of wastewater for land application. Montalvo Municipal Improvement District, a municipality owns the Montalvo Water Pollution Control Plant (Plant), located at 3555 Ventura Road, Montalvo, Calif. Treated domestic and commercial wastewaters are discharged under Waste Discharge Requirements contained in Order No. 87-092, adopted by the Regional Board on Jun. 22, 1987. The present wastewater treatment system shown in FIG. 1 consists of bar screening, comminuting, influent holding tank, two independent sequencing aerobic and denitrification batch reactors, with discharge into a final lined polishing pond. No off-site transfer or usage of treated wastewater is presently employed. The waste activated wastewater liquids between the floating and settling solids is extracted and discharged to the subsurface through two evaporation/percolation ponds with a combined capacity of two million gallons. The aerobic and denitrification treated solids and liquids have polymers added to aid in separation and are sent to Geotubes on drying beds to collect the solids. The liquids from the Geotubes in the drying beds are collected and recirculated through the aerobic digesters and denitrification batch reactors building up its bicarbonate and salt composition. As presently there is no off-site disposal of the treated liquids, effluent limitations are not exceeded. In case of emergency, the Plant has an emergency power station and a one-million gallon concrete-lined pond to store untreated and/or treated wastewater which can then be returned to the head works of the Plant for treatment as needed.

Figure 2:
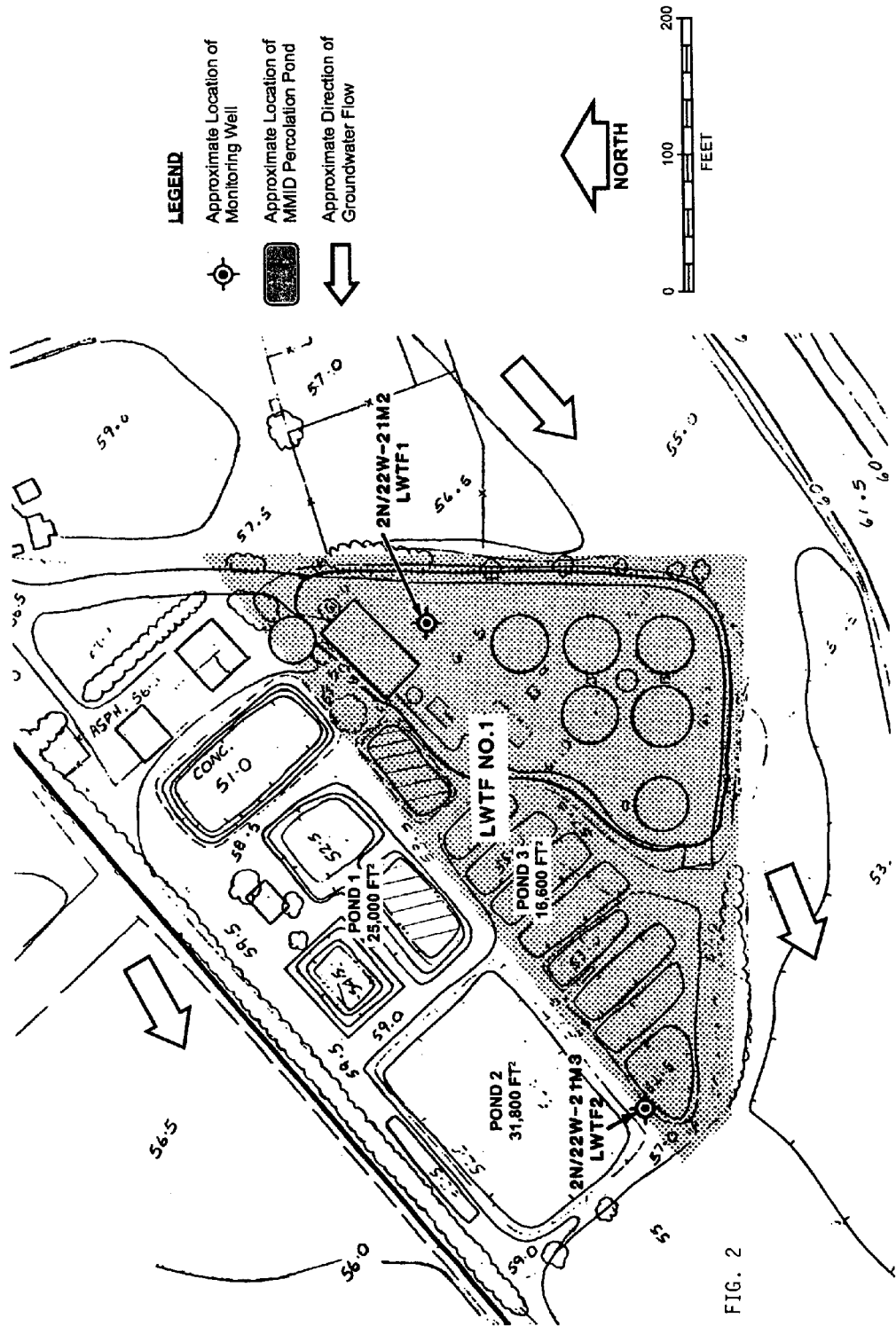
FIG. 2 illustrates the layout of the Montalvo Wastewater Treatment Plant.

The Plant has a design capacity of 720,000 gallons per day (gpd). An average daily dry weather flow of up to 322,000 gpd was discharged during 1995 to the subsurface through evaporation/percolation ponds. Waste sludge is treated onsite by aerobic digestion, and then discharged into lined sludge drying beds. Treated sludge is hauled offsite and disposed of at a legal disposal facility. The Plant layout and evaporation/percolation ponds are shown in FIG. 2 and the Plant's effluent discharge limitations are:

| Constituent Limitation | Effluent Limitations Units | Maximum Effluent Limitation |
|---|---|---|
| Total dissolved solids | mg/L | 3,000 |
| Sulfate | mg/L | 1,000 |
| Chloride | mg/L | 500 |
| Nitrate-N plus nitrite-N plus ammonia-N | mg/L | 10 |
| Oil & grease | mg/L | 15 |
| Suspended solids | mg/L | 30 |
| Total organic carbon | mg/L | 20 |
| BODs 20° C. | mg/L | 30 |

The pH of wastes discharged shall at all times be within the range 6.5 to 8.5 pH units.

Any wastes that do not meet the foregoing requirements shall be held in impervious containers, and discharged at a legal point of disposal.

Wastes discharged shall not contain heavy metals, arsenic, or cyanide in concentrations exceeding the limits contained in the current California Drinking Water Standards.

There shall be no discharge of wastes to surface water or watercourses at any time.

Neither the treatment nor the discharge of waste shall create a condition of pollution, contamination, nuisance or problems due to breeding of mosquitoes, gnats, midges, flies, or other pests.

Wastes discharged shall not impart tastes, odors, color, foaming or other objectionable characteristics to receiving groundwater.

Wastes discharged shall at no time contain any substance in concentrations toxic to human, plant, or aquatic life.

The evaporation/percolation ponds shall not contain floating materials, including solids, foams, debris, or scum, in concentrations that cause nuisance, adversely affect beneficial uses, or serve as a substrate for undesirable bacterial and algal growth and insect vectors. The evaporation/percolation ponds shall be maintained so as to be free of weeds and excessive vegetation growth.

Figure 1:
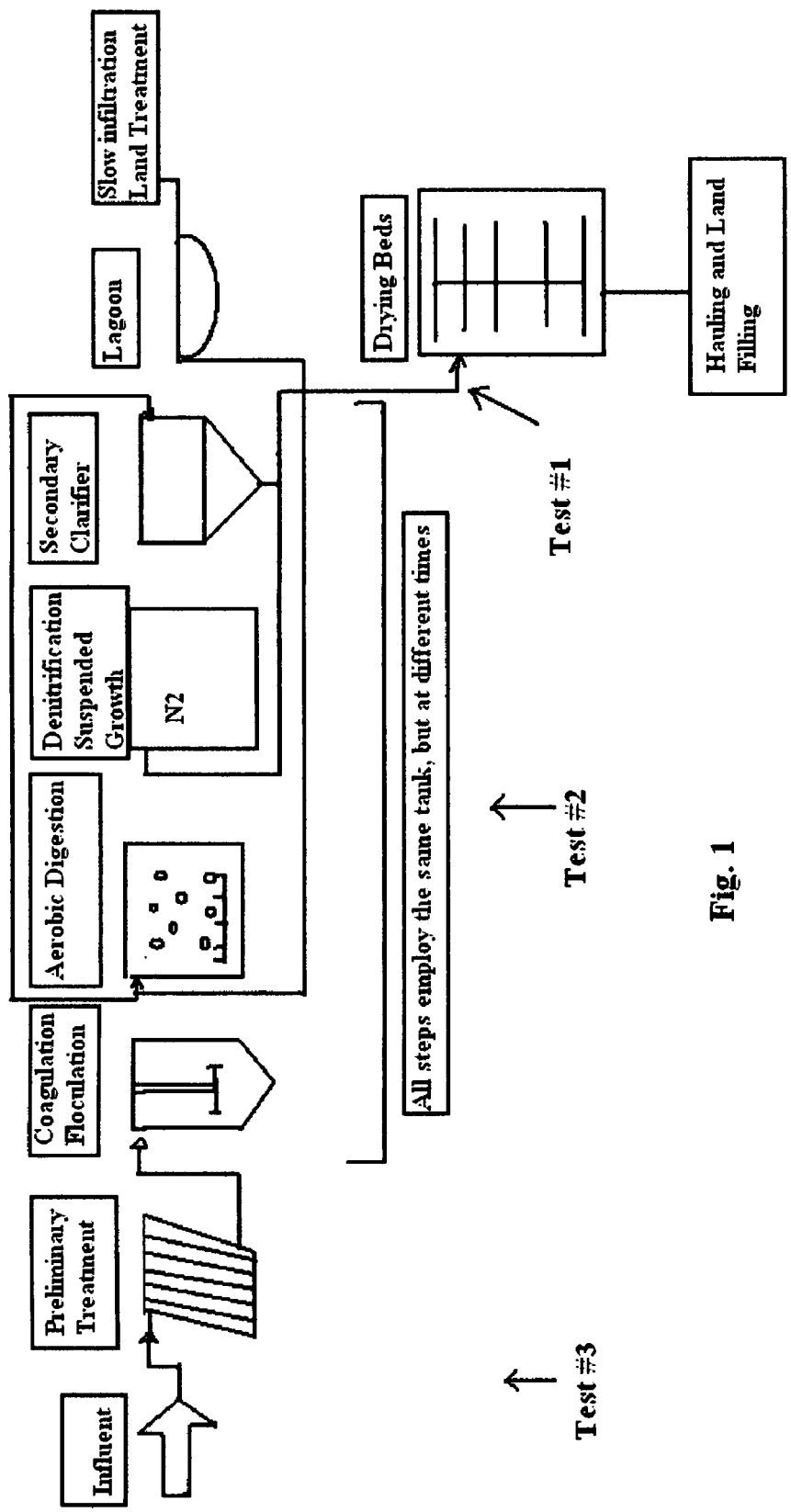
FIG. 1 illustrates the sequence of the Montalvo Wastewater Treatment Plant process.

Testing began on Oct. 17, 2006 at the Montalvo Municipal Improvement District Wastewater Treatment Plant. The first test was conducted at a point just after the second clarifier before the drying beds as shown in FIG. 1.

A Harmon Systems International LLC, Bakersfield, Calif. Model 10 Sulfurous Acid Generator was set up near the Ennix Digester Settling Tank and a liquid polymer mixing tank presently used to agglomerate solids therein as shown in FIG. 4.

Decant from the Ennix Digester was then extracted from the Digester tank vault and analytically tested along with samples of the influent and activated sludge. These showed successively higher concentrations of contaminants as the solids were successively processed for concentration. FIGS. 4a and 4b are tables of the actual testing results performed by independent testing laboratories.

Decant was pumped through the sulfurous acid generator. The treated decant was then acidified and sent to the Geotube polymer woven fiber separation bags placed on the drying beds. To test the affects of the acid on the solids in the decant, five gallon bucket samples were periodically taken and run through a small Geocube field test kit made of the same material of the larger Geotubes GT500 cloth and the filtered liquids checked. Without the addition of polymers to the acidified wastewater, small fines still passed through the weave of the Geocube GT500 woven bag.

The high bicarbonates and concentrated contaminants in the Ennix Digester decant limited its pH reduction with one pass through the sulfurous acid generator to approximately a pH of between 5.3 and 5.7. The sulfurous acid generator did not plug up its scrubbing tower with this test, suggesting that its use at the head works with lower concentration wastewater would be possible. To test the acid capabilities of the Harmon sulfurous acid generator, domestic water was passed through the sulfinurous acid generator and produced sulfurous acid having a pH of between 1.5 and 2.8. This low pH sulfinurous acid was then added to the inflow raw wastewater until its pH reached approximately 2. At the lower pH, the clear settling jar samples showed that the solids were conditioned changing color from the dark brown of the raw wastewater to a lighter brown gray. Similarly, the liquid fraction also changed color from a green to a lighter brown gray colloidal suspension, which had no odor.

In addition, the separated solids, although dry, brittle and odorless, were difficult to burn due to the high amount of clays present. These acid treated solids, however, were much lighter than the polymer separated solids, which were still viscous. The BTU analysis of the two samples showed that the acid treated separated solids would not ignite in the laboratory to provide its BTU/lb. composition even though applying a blow torch in the field showed it would burn. The polymer separated solids had a 6767 BTU/lb. composition according to the Testamerica laboratory report dated Nov. 29, 2006. The water content of the polymer separated solids was so high they were still viscous after months of drying in the open air.

Based on these tests of the Ennix Digester treated solids and liquids, it was decided to move further upstream to recover liquids and solids, which had not been overly concentrated. The Ennix Digester composition had a 2000+ mg/l bicarbonate composition as opposed to a 650 mg/l bicarbonate composition at the head works so a lower pH could be achieved with one pass through the acid generator. The resultant sulfinurous acid treatment of the wastewater influent would therefore provide better quality water, and possibly a solid with better fuel characteristics.

Figure 5:
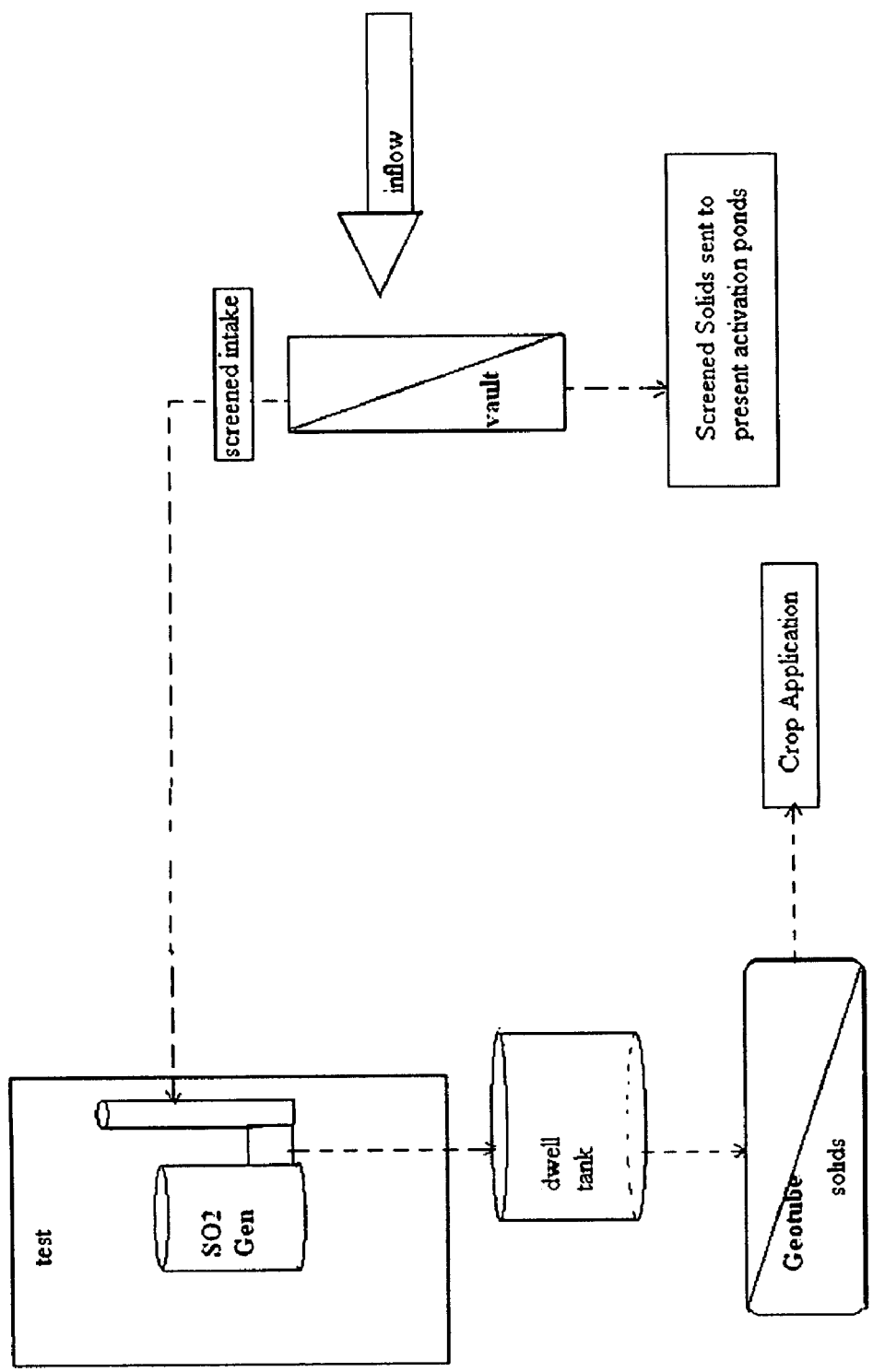
FIG. 5 is a preferred embodiment of a chemical/biological dewatering equipment layout.

The acid generator equipment was then relocated to the head works. The Harmon acid generator was set up to pump wastewater influent from the upstream side of the comminutor auger using a screened check valve intake system attached to the end of its four inch intake tubing as shown in FIG. 5. The screened wastewater inflow was then pumped directly through the acid generator and sampled. The acid generator produced in one pass-through treated wastewater at a pH of approximately 2 or lower. This treated wastewater was odorless, and had conditioned light grey solids, which self adhered to themselves; not the sides of the vessels or tubing or acid generator tower packing.

The acid generator and dwell tank were mounted above the intake vault with a pumping lift of approximately 20 feet. The acid treated wastewater was then pumped into a 1,000 gallon dwell tank. For the test, approximately 700 gallons of treated wastewater was passed into a dwell tank to see if additional settling would occur. As the fall of the treated wastewater entering the tank released some SO2 into the dwell tank, the tank access portal was sealed to prevent gas exposure.

After the acid generator equipment was connected, settling jar samples were then taken every ten minutes of the treated wastewater after it passed through the acid generator. These were pH tested and allowed to stand alongside a raw wastewater sample as shown below.

The color of the acid treated wastewater liquid fraction changed in color from the raw greenish color to a lighter gray brown color. The conditioned solids changed in color from a dark brown to a light grey. These settling jars were then allowed to settle overnight to see if any significant changes occurred to the settling bottles.

Although some additional settling in the dwell tank occurred, it was not significantly more than that which occurred after about a half hour. The sulfurous acid treated samples were still odor free (with the exception of a slight acid smell), while the raw wastewater retained its putrid smell.

After non-agitated samples were taken, the tank was thoroughly mixed with air, for approximately an hour. This did not produce any significant additional settling, and released more SO2 into the top of the closed tank.

The acid treated wastewater was then filtered using 70 micron filter paper with a vacuum flask to completely separate the fines. All of the suspended solids were removed on the filter papers, leaving clear separated wastewater. The clear separated acidified wastewater was then pH adjusted with lime to raise the pH to approximately 9 until the heavy metals, except copper and nickel precipitated out (To remove the copper and nickel, a pH of 11 is required). This pH 9 solution was then run through a filter producing a light gray solid of gypsum and metal hydroxides layer left on the filter paper. The color and transparency of the filtered pH 9 treated waters was indistinguishable from tap water.

The preferred chemicals used for pH reduction for land application are anhydrous or hydrous sulfur dioxide, which provide rapid water/solids separation. To prevent operator exposure to sulfur dioxide, preferably a sulfurous acid generator is employed. The preferred chemical for pH rising is lime (CaO), but other bases, such as soda ash ($Na_2Co_3$), Caustic Soda (NaOH) could be used.

After removal of the heavy metals at the higher pH, the high pH is then reduced to that required for land application via the addition of sulfurous acid or other acids, such as sulfuric ($H_2SO_4$), and hydrochloric (HCl) could be used, depending upon the effluent limitations. However, sulfurous acidification generates $CaSo_4$ (gypsum), which is a fine soil amendment.

Samples of the raw water, the acidified unfiltered wastewater, acidified filtered wastewater, and acidified filtered and lime pH treated wastewater were then sent to the Testamerica Laboratory for contaminant tests summarized in FIGS. 4a and 4b. The appended Testamerica reports show that the acid treated wastewater is full of plant nutrients and some ammonia resulting in a high BOD water discharge. These dissolved nutrients and ammonia were neutralized with lime forming a slight acidic pH adjustment of around 6.5 to provide a desirable plant nutrient solution for land application minimizing the need for ammonia fertilizers.

However, if further polishing is desired, the ammonia could be removed using the plant's existing digesters. The Nickel and Copper heavy metals could be removed by raising the pH to 11 for filtration of the Nickel and Copper hydroxides, and then the pH is lowered for land application.

Sulfinurous acid treated and untreated samples were sent to the Fruit Growers Laboratory on Nov. 29, 2006 for coliform tests. The results of the raw wastewater, the filtered pH 2 acid treated wastewater, the filtered pH 9 lime treated wastewater, and the unfiltered air stirred acid treated wastewater showed the following:

| Sample | Total Col. | Units |
|---|---|---|
| Raw Waste Water | >1600 | Most Prob. Number |
| Acid Treated Waste Water | <2 | " |
| Filtered Acid Lime Waste Water | <2 | " |
| Air Mixed Acid Treated Waste Water | <2 | " |

The coliform tests indicated that this acid treated wastewater is essentially pathogen free, and therefore can be land applied as gray water (California present gray water standards require total coliforms <10) without further treatment where the nutrients and ammonia soil amendments are not an issue.

The acid treated solids were then tested. Approximately 40 gallons of treated wastewater was then taken from the dwell tank and separated via a Geocube GT500 fabric. The Geocube GT500 separated the larger solids, but left some fines in the liquid fraction. The Geocube was then allowed to dry overnight where the temperatures reached a low of 30 degrees.

The next day the Geocube GT500 was inspected and found that it and its contents had dried overnight. It was so light that it had to be held down with a rock to prevent it from blowing around. Cutting open the Geocube showed that a layer of gray fibrous material was trapped therein, along with seeds and other larger particles. These acid treated dried solids were then sent to the Timpview Analytical laboratory for BTU testing and water analysis. The Timpview Analytical laboratory showed an average BTU content of 5,690/lb, and a moisture content of 42.1%. Consequently, the dry, light solids may be used as a fuel or disposed of with reduced haulage costs. Their elevated BTU content provides a fuel comparable to wood, and as they are odorless, dry storage does not produce undesirable odors.

These tests indicate that the acid treated wastewater at the MONTALVO MUNICIPAL IMPROVEMENT DISTRICT may be land applied where small amounts of ammonia and dissolved solids provide soil amendment. Further, the resulting volume of separated solids is considerably less than that encountered in the present operations, while making available approximately 365 acre feet of water for agricultural and landscaping use.

The resultant treated filtered wastewater is disinfected without need for further chlorine treatment. As the filtered solutions are clear, if further disinfection is required, ultraviolet light may be employed to avoid the use of chlorine, which generates carcinogenic compounds. As the land surrounding the plant contains alkaline soils, the treated filtered wastewater is preferably acidified to the pH of approximately 6.5 to reduce bicarbonate buildup in the soil.

Figure 6:
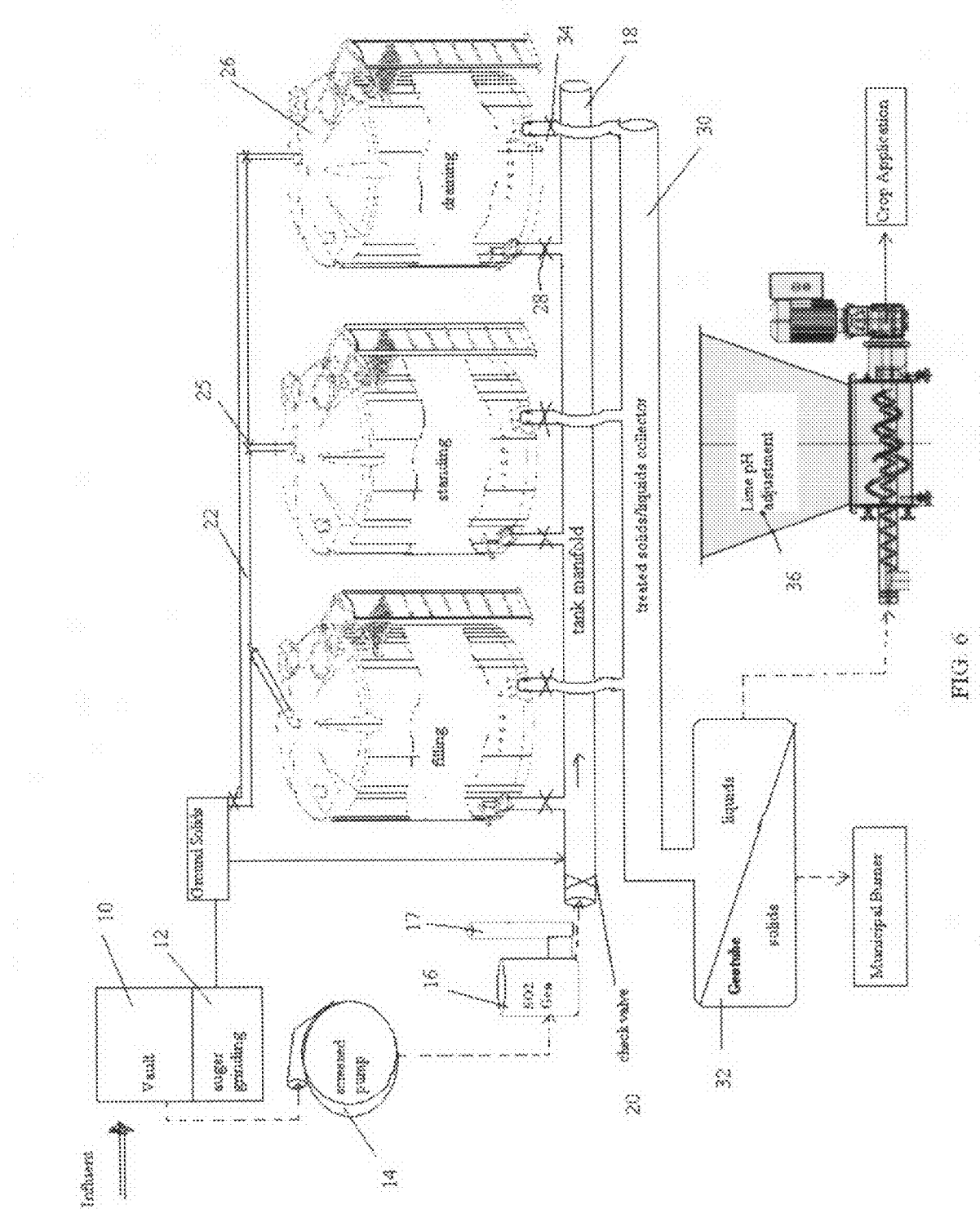
FIG. 6 is another preferred embodiment of a chemical/biological dewatering equipment layout.

FIG. 6 is a preferred embodiment of a chemical/biological dewatering equipment layout for full scale treatment of the wastewater inflows of the Montalvo Municipal Improvement District based on the data parameters. The design extracted the majority of the wastewater inflows entering the wetwell 10 via a screened pump 14 intake and passed them through an SO2 generator 16 for pH reduction to 2 or lower for delivery into a tank manifold 18 interconnecting three dwell tanks 26. The remaining inflows passed through an auger grinder 12 and were then pumped into the tank manifold 18 with a one way valve 20 to prevent backup and insure admixing with the acid treated inflows for deodorizing and solids conditioning. The tank manifold 18 has three fill valves 28, which are activated to selectively fill the three 10,000 gallon polypropylene dwell tanks 26. The dwell tanks 26 are connected in series such that as one is filling, one is standing, and a third is draining into a treated solids/liquids collector 30 to provide the minimal one half hour dwell time. Drain valves 34 are selectively activated to control the fill/stand/empty sequence collapsing the floating solids into the settled solids for tank removal and subsequent filtration. The acid treated solids and liquids are then drained into a Geotube 1000 polypropylene bag 32 to separate the solids for burning, and the liquids for subsequent pH adjustment with liming equipment 36 for land application.

To insure that the acid tower 17 of the sulfinurous acid generator 16 is not plugged, a self cleaning screen pump 14 with a screened inlet (not shown) such as those produced by Rain Bird or Yardney Water Management Systems, Inc. of Riverside, Calif., may be included to take the majority of the wastewater inflow before auger grinding to insure that the particulates passing through the acid tower were less that ⅓ inch.

As the neutralized acid treated liquids were within the discharge limitations for land application (pathogens <10, no significant heavy metals, and full of nutrients and some ammonia), the separated treated liquids would be disposed of by watering the adjacent golf course or selective nonconsumptive crop application.

In addition, present sprinkler systems and irrigation equipment will tolerate 200 micron particles, so removal of all the majority of the suspended solids may be accomplished with a Geotube GT1000 having an approximately 100 micron weave. Testing of the Geotube GT1000 showed that a fine colloidal suspension was left in solution, which acts as another source of plant nutrients. The filled Geotube GT1000 dried overnight and contained a number of deodorized, dry solids, which were suitable for land application or disposal as a fuel in a municipal burner due to its low moisture content and high BTU content of the dried treated solids.

A Harmon Systems International, LLC Model 60 SO2 Generator 16 produced by D & J Harmon Co., Inc., 2201 Coy Avenue, Bakersfield, Calif. 93307 was employed to acidify and condition the wastewater solids and liquids. The Model 60 has the capacity of handling flows between 223 gpm to 600 gpm and was able to bring the pH down to 2 or lower with one pass under a wide variety of operating conditions and flows.

The three dwell tanks 26 have covered tops adapted with a pressure relief vent 25 with a hose 22 in communication with the wastewater inflows to inject any surplus SO2 generated into the incoming wastewater stream ground solids. An air intake valve (not shown) in the covered top is also included and selectively opened and closed during filling and draining. The pressure relief hose is similarly also selectively opened and closed to insure capture of any excess SO2 in the top of the tanks 26 to prevent release into the atmosphere.

The tank manifold 18 and valves 28, 24, and vent 25 are controlled by a control panel (not shown) to selectively fill one tank, let it stand for approximately 30 minutes for conditioning of the solids and liquids, and then let it drain while the other tanks are being similarly filled and drained.

The drain bags 32 normally act in three stages as discussed above: Containment Dewatering, and Consolidation. After the final cycle of filling and dewatering, the retained fine grain materials can continue to consolidate by desiccation because the residual water vapor escapes through the geotextile.

The filtered acidified wastewater leaving the drain bag 32 is then collected for pH adjustment before land application using lime to precipitate out excess sulfates as gypsum. To increase the pH of the acid treated filtered wastewater required for land application, a lime feeding system 36 such as the Large Omega™ Systems for Waste Neutralization produced by Wastech Controls and Engineering of Chatsworth, Calif. This lime feeding system 36 can be operated to raise the pH to above 10 to remove all the heavy metals, if necessary, and is then pH reduced between pH 6 and 8 for land application.

The chemical/biological wastewater treatment plant method and apparatus thus employs rapid sludge chemical dewatering technology for solids conditioning and recovery and the production of nutrient and ammonia liquids in conjunction with an environmental biological system for treating the separated treated wastewater by land applying it for plant consumption, and/or passing it through aqueous plant or microbial reduction of the dissolved solids and ammonia avoiding the need for micro screening. As they provide an order of magnitude more rapid conditioning of the solids and liquids, the footprint of the plant is a fraction of that of competing wastewater treatment systems. This enables the remaining ground of a converted conventional plant to be sold or put to other uses.

Figure 7:
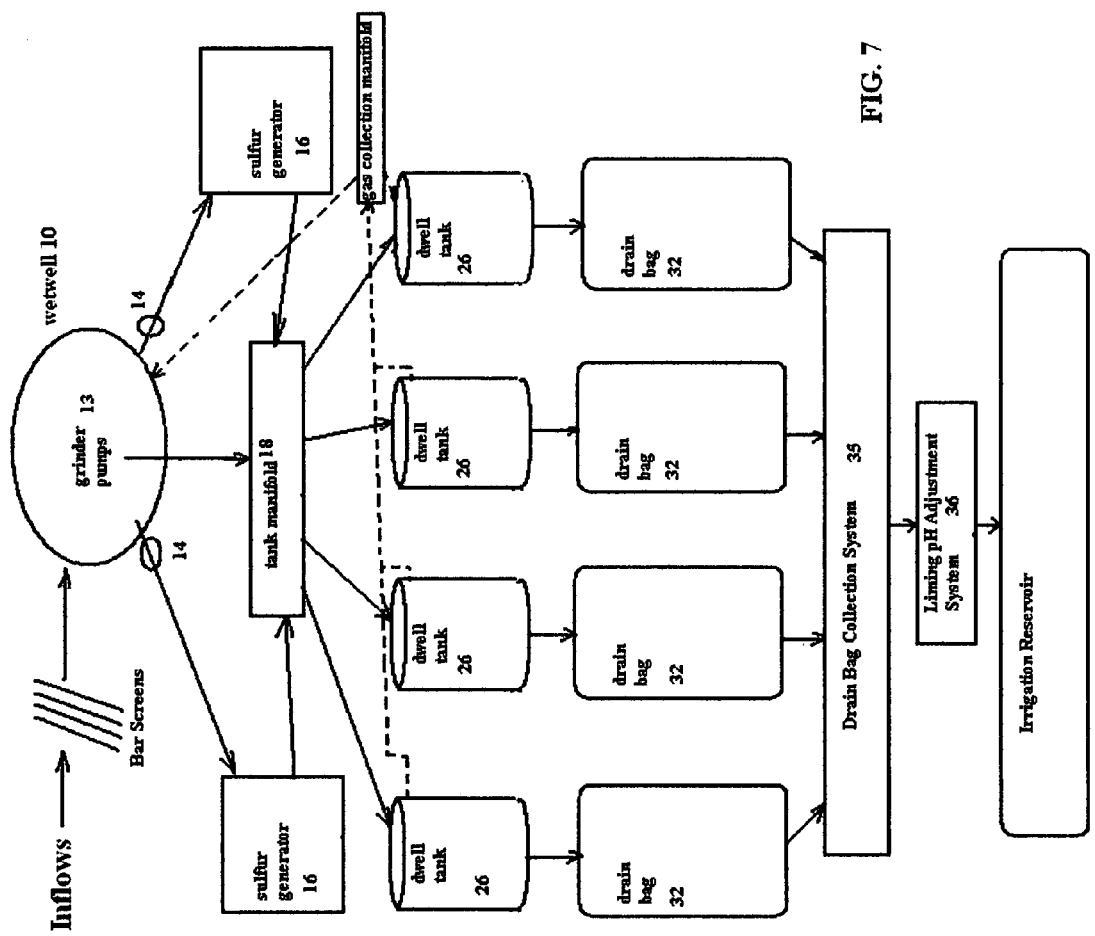
FIG. 7 is another preferred embodiment of a chemical/biological dewatering wastewater treatment plant.

FIG. 7 is another preferred embodiment of a package chemical/biological dewatering wastewater treatment plant employing double redundancy—i.e. two sets of dwell tanks 26 similarly adapted as described above to capture SO2 for reinjection via a gas manifold and air valves to allow drainage, and with tank manifolds 18 associated with two sulfurous acid generators 16, and two sets of drain bags 32. The bar screened inflows from a wet well are sucked into sulfur generators 16 via a screened pump intake 14. The remaining solids slurry is passed into a tank manifold 18 via grinder pumps 13. to be blended with the acidified treated wastewater from the sulfur generators 16. The tank manifold 18 then selectively fills four 10,000 gallon dwell tanks 26, which hold the treated wastewater and solids until the required conditioning and disinfection has occurred. The combined treated flows are then collected in a drain bag collection system 35 and passed through liming equipment 36 for pH adjustment before land application. This embodiment is employed for new construction where an existing wastewater treatment plant is not available as a backup system in the event of emergency or extremely high flood flows.

Although this specification has made reference to the illustrated embodiments, it is not intended to restrict the scope of the claims. The claims themselves recite those features deemed essential to the invention.

I claim:

1. A chemical/biological wastewater treatment plant method for wastewater with dissolved and undissolved solids comprising:
   a. testing water quality at various points in a wastewater treatment plant for its contaminant and solids composition,
   b. determining the end use effluent requirements for the treatment plant's treated wastewater,
   c. selecting a treatment point in the wastewater treatment plant for pH adjusting and injecting sulfur dioxide into the wastewater to meet the end use effluent and solids requirements,
   d. deodorizing and conditioning the wastewater at the selected point by injecting into the wastewater sulfur dioxide at a pH which generates sufficient SO2 to condition solids for separation and deodorize the wastewater,
   e. holding the sulfurous acid treated wastewater in a detention vessel, which captures any excess SO2 emitted by the wastewater for reinjection, until the suspended solids agglomerate, dissolved solids and ammonia are conditioned, and the required effluent disinfection occurs,
   f. screening the agglomerated solids from the sulfurous acid treated wastewater for disposal to reduce the suspended solids in the separated treated wastewater having elevated BOD dissolved and suspended solids and ammonia nutrients to a concentration level required by the end use effluent requirements for discharge,
   g. pH adjusting the separated nutrient wastewater solution and any suspended solids to reduce the biocidal properties of any free SO2 in the wastewater and provide the pH required for subsequent environmental biological treatment, and
   h. environmentally biologically treating the separated nutrient liquid solution and any suspended solids by land applying it for plant consumption, and/or passing it through aqueous plant or microbial reduction of the dissolved solids and ammonia for BOD compliance to produce water of sufficient quality to meet open stream and ocean effluent discharge requirements.

2. A chemical/biological wastewater treatment plant method according to claim 1, wherein the pH adjusting of the separated nutrient liquid solution and any suspended solids is first raised to a level of up to 11 to precipitate heavy metals contained in the wastewater for removal, and the resultant metal free filtrate is then pH reduced for environmental biological treatment.

3. A chemical/biological wastewater treatment plant method according to claim 1 wherein the deodorizing and conditioning of the wastewater comprises passing the coarsely screened or commutated wastewater through a sulfurous acid generator with an acid scrubbing tower for admixing with sulfur dioxide at a pH of between approximately 1.5 and approximately 3, which generates sufficient free SO2 to condition solids for separation and deodorize the wastewater.

4. A chemical/biological wastewater treatment plant method according to claim 1, wherein the treatment point comprises the wastewater treatment plant inflows, and including
   a. screening the majority portion of the wastewater inflow stream and passing it through the sulfurous acid generator, the screen porosity selected such that the inflow stream does not plug up the acid scrubbing tower of the sulfurous acid generator,
   b. comminuting the remaining portion of the separated wastewater stream to reduce larger particles for sulfurous acid treatment, and
   c. transmitting both portions into a detention vessel in communication with the acidified wastewater inflow stream and comminuted wastewater stream, for admixing sufficient sulfur dioxide into the total wastewater inflows and holding the same for a period of time until the wastewater odor is suppressed and the suspended solids are conditioned to agglomerate and separate from the liquid fraction of the wastewater for solids separation by filtration.

5. A chemical/biological wastewater treatment plant method according to claim 1, wherein the treatment point comprises the wastewater treatment plant inflows, and including
   a. screening the wastewater inflow stream by passing it through a woven bag to separate larger particles and passing the screened wastewater through the sulfurous acid generator, the screen porosity selected such that the inflow stream does not plug up the acid scrubbing tower of the sulfurous acid generator,
   b. disposing of the woven bag, when filled with larger particles, and
   c. transmitting the filtered wastewater into a detention vessel for admixing with sufficient sulfur dioxide and holding the same for a period of time until the wastewater odor is suppressed and the suspended solids are conditioned to agglomerate and separate from the liquid fraction of the wastewater for solids separation by filtration.

6. A chemical/biological wastewater treatment plant method according to claim 1, wherein the screening comprises passing the sulfinurous acid treated wastewater through an acid resistant porous bag placed on a drain pad structured to receive the sulfur dioxide treated wastewater, the drain bag having a mesh sized to collect and separate particles of suspended solids of a desired size leaving a solution of a desired solids suspension content with a high BOD dissolved solids and ammonia nutrient liquid solution.

7. A chemical/biological wastewater treatment plant method according to claim 6, wherein the holding time is selected to sufficiently agglomerate the suspended solids for capture within the porous bag.

8. A chemical/biological wastewater treatment plant method according to claim 7, wherein the separated suspended solids in the drain bag are allowed to chemically dewater to provide solids with a high BTU content solid with low water content for burning or gasification.

9. A chemical/biological wastewater treatment plant method for wastewater inflow streams with dissolved and undissolved solids comprising:
   a. determining the possible end use effluent requirements for the treatment plant's treated wastewater,
   b. deodorizing and conditioning the treatment plant wastewater inflows by coarsely screening or commutating the solids in the wastewater inflow stream before passing it through a sulfinurous acid generator with an acid scrubbing tower for admixing with sulfur dioxide at a pH between approximately 1.5 and approximately 3, to inject sufficient SO2 to condition the solids for separation and deodorize the wastewater, the screen porosity or commutator selected such that the inflow stream solids particles do not plug up the acid scrubbing tower of the sulfurous acid generator,
   c. transmitting into a detention vessel the acidified SO2 injected wastewater to hold the same for a period of time until the wastewater odor is suppressed and the suspended solids are conditioned to agglomerate and separate from the liquid fraction of the wastewater for solids separation by filtration and the dissolved solids and ammonia are conditioned and the required effluent disinfection occurs,
   e. screening the agglomerated solids from the sulfurous acid treated wastewater to remove suspended solids in the separated treated wastewater at the level required by the end use effluent requirements for disposal, leaving a high BOD dissolved solids and ammonia nutrient liquid solution,
   f. pH adjusting the separated nutrient liquid solution by raising its pH to reduce the biocidal properties of the free SO2 in the wastewater and provide the required pH of between approximately 6 to approximately 8 for subsequent environmental biological treatment, and
   d. environmentally biologically treating the separated nutrient liquid solution by land applying it for plant consumption, and/or passing it through aqueous plant or microbial reduction of the dissolved solids and ammonia for BOD compliance to produce water of sufficient quality to meet open stream and ocean effluent discharge requirements.

10. A chemical/biological wastewater treatment plant method according to claim 9, wherein the screening comprises passing the sulfurous acid treated wastewater through an acid resistant porous bag placed on a drain pad structured to receive the sulfur dioxide treated wastewater, the drain bag having a mesh sized to collect and separate particles of suspended solids of a desired size leaving a solution of a desired colloid content.

11. A chemical/biological wastewater treatment plant method according to claim 9, wherein the holding time is selected to sufficiently agglomerate the suspended solids for capture within the porous bag.

12. A chemical/biological wastewater treatment plant method according to claim 7, wherein the separated suspended solids are allowed to chemically dewater to provide a high BTU content solid with low water content for burning or gasification.

13. A chemical/biological wastewater treatment plant method according to claim 9, wherein the pH adjusting of the separated nutrient liquid solution is raised up to approximately 11 to first precipitate heavy metals contained in the wastewater for filtration removal, and the resultant metal free filtrate is then pH reduced for subsequent environmental biological treatment.

14. A chemical/biological wastewater treatment plant method according to claim 9, including:
   a. polishing the separated water to the end user requirements, and
   b. disposing of the treated solids and separated liquids.

15. A chemical/biological wastewater treatment plant method according to claim 14, wherein the treated solids are dried and admixed with mechanically separated wastewater solids having a higher moisture content in a ratio to provide a combined fuel with a reduced overall moisture content of the mechanically separated solids.

16. A chemical/biological wastewater treatment plant method according to claim 9, wherein the separated nutrient solution is land applied and has insect repellent properties.

17. A chemical/biological wastewater treatment plant apparatus for wastewater with dissolved and undissolved solids comprising:
   a. a vessel for receiving wastewater influent from a gathering system,
   b. a sulfurous acid generator with an acid scrubbing tower, and a screened intake hose in communication with the wastewater influent for extracting coarsely filtered wastewater influent for passage through the sulfurous acid generator, which injects SO2 into the screened wastewater at a pH which generates sufficient sulfurous acid and free SO2 for odor suppression and conditioning of the suspended solids to agglomerate and separate from the liquid fraction of the wastewater, the screened intake porosity selected such that the inflow stream does not plug up the acid scrubbing tower of the sulfurous acid generator, c. a grinder pump, shredder or commutator intake means in communication with the screened solids to comminute the remaining portion of the wastewater stream, d. collection and transmission means in communication with the screened SO2 treated wastewater influent and the commutated screened solids remaining portion of the separated wastewater stream, e. an enclosed detention vessel structured to capture any excess SO2 released from the SO2 treated wastewater influent for re-injection or scrubbing in communication with the collection and transmission means for admixing the SO2 treated wastewater influent with the commutated screened solids remaining portion of the wastewater stream and holding the same for a period of time to deodorize and condition the combined wastewater influent, until the suspended solids agglomerate, dissolved solids and ammonia are conditioned, and the required effluent disinfection occurs, f. screening means to remove suspended solids from the sulfurous acid treated wastewater at a concentration level required by the end use effluent requirements for disposal from the BOD dissolved solids and ammonia nutrient liquid solution, g. pH adjustment means for adjusting the separated nutrient liquid solution to reduce the biocidal properties of the free SO2 in the wastewater and provide the pH required for subsequent environmental biological treatment, and h. an environmental biological system for treating the nutrient liquid solution by land applying it for plant consumption, and/or passing it through aqueous plant or microbial reduction of the dissolved solids and ammonia for BOD compliance to produce water of sufficient quality to meet open stream and ocean effluent discharge requirements.

18. A chemical/biological wastewater treatment plant apparatus according to claim 17, wherein the pH adjusting of the nutrient liquid solution is first raised sufficiently to precipitate heavy metals contained in the wastewater for filtration removal, and the resultant metal free filtrate is then pH reduced for environmental biological treatment.

19. A chemical/biological wastewater treatment plant apparatus according to claim 17, wherein the screening means comprises passing the sulfurous acid treated wastewater through at least one acid resistant porous bag placed on a drain pad structured to receive the sulfur dioxide treated wastewater, the drain bag having a mesh sized to collect and separate particles of suspended solids of a desired size leaving a solution of a desired colloid content, and wherein the drain bag, when filed with conditioned solids is land filled, burned, or gasified.

20. A chemical/biological wastewater treatment plant apparatus according to claim 19, wherein the holding time in the dwell tank is selected to sufficiently agglomerate the suspended solids for capture within the porous bag.

21. A chemical/biological wastewater treatment plant apparatus according to claim 19, wherein the separated suspended solids are allowed to chemically dewater to provide a dried high BTU content solid with low water content for burning or gasification.

22. A chemical/biological wastewater treatment plant apparatus according to claim 18, wherein the demetalized treated wastewater is disposed of in stream or ocean water to dilute their heavy metal concentration to minimize eutrophication.

23. A chemical/biological wastewater treatment plant apparatus according to claim 21, wherein the chemically separated dried solids are admixed with polymer separated solids with higher moisture content in a ratio to provide a combined fuel with a reduced overall moisture content of the mechanically separated solids.

24. A chemical/biological wastewater treatment plant apparatus for wastewater with dissolved and undissolved solids comprising:

a. a vessel for receiving wastewater influent from a gathering system, b. filtration means associated with the wastewater influent to screen and separate larger particles for disposal from the screened wastewater, the filtration means porosity selected such that the suspended solids particle size of the screened inflow stream does not plug up an acid scrubbing tower of a sulfurous acid generator, c. a sulfurous acid generator with an acid scrubbing tower, with an intake in communication with the screened wastewater influent for passage through the sulfurous acid generator scrubbing tower, which injects SO2 into the screened wastewater at a pH which generates sufficient sulfurous acid and free SO2 for odor suppression and conditioning of the suspended solids to agglomerate and separate from the liquid fraction of the wastewater, d. collection and transmission means in communication with the screened SO2 treated wastewater influent and the commutated remaining portion of the separated wastewater stream, e. an enclosed detention vessel structured to capture any excess SO2 released from the SO2 treated wastewater influent for reinjection or scrubbing in communication with the collection and transmission means for admixing the SO2 treated wastewater influent with the commutated remaining portion of the wastewater stream and holding the same for sufficient time to deodorize and condition the screened wastewater influent, until the suspended solids agglomerate, dissolved solids and ammonia are conditioned, and the required effluent disinfection occurs, f. screening means associated with the SO2 treated wastewater to remove suspended solids from the sulfurous acid treated screened wastewater at a particle size and concentration level required by the end use effluent requirements for disposal leaving a high BOD dissolved solids and ammonia nutrient liquid solution, g. pH adjustment means associated with the screened SO2 treated wastewater for adjusting the separated nutrient liquid solution pH to reduce the biocidal properties of the free SO2 in the wastewater and provide the pH required for subsequent environmental biological treatment, and h. an environmental biological system for treating the nutrient liquid solution by land applying it for plant consumption, and/or passing it through aqueous plant or microbial reduction of the dissolved solids and ammonia for BOD compliance to produce water of sufficient quality to meet open stream and ocean effluent discharge requirements.

25. A chemical/biological wastewater treatment plant apparatus according to claim 24, wherein the filtration means comprises a first woven porous bag, which can be landfilled, burned or gasified when filled with screened wastewater solids.

26. A chemical/biological wastewater treatment plant apparatus according to claim 25, wherein the screening means comprises a second woven porous bag with a tighter weave than the first woven porous bag to capture disinfected wastewater solids for land application.

* * * * *